US012671782B2

(12) United States Patent
Wang et al.

(10) Patent No.: US 12,671,782 B2
(45) Date of Patent: Jun. 30, 2026

(54) LOCAL TONE MAPPING OF PROCESSED IMAGE

(71) Applicant: Apple Inc., Cupertino, CA (US)

(72) Inventors: Muge Wang, San Jose, CA (US); William T Warner, Sunnyvale, CA (US); David R Pope, Campbell, CA (US)

(73) Assignee: APPLE INC., Cupertino, CA (US)

( * ) Notice: Subject to any disclaimer, the term of this patent is extended or adjusted under 35 U.S.C. 154(b) by 230 days.

(21) Appl. No.: 18/117,065

(22) Filed: Mar. 3, 2023

(65) Prior Publication Data

US 2024/0297949 A1 Sep. 5, 2024

(51) Int. Cl.
| | |
|---|---|
| *H04N 1/60* | (2006.01) |
| *G06T 3/00* | (2024.01) |
| *G06T 3/18* | (2024.01) |
| *G06T 3/40* | (2024.01) |
| *G06T 3/4007* | (2024.01) |
| *G06T 5/00* | (2024.01) |
| *G06T 5/92* | (2024.01) |
| *G06T 7/90* | (2017.01) |

(Continued)

(52) U.S. Cl.
CPC ............. *H04N 1/6019* (2013.01); *G06T 3/18* (2024.01); *G06T 3/4007* (2013.01); *G06T 5/92* (2024.01); *G06T 7/90* (2017.01); *G06V 10/56* (2022.01); *G06V 10/60* (2022.01); *H04N 9/69* (2013.01); *G06T 2207/10024* (2013.01)

(58) Field of Classification Search
CPC .......... H04N 1/6019; H04N 9/69; G06T 7/90; G06T 3/18; G06T 5/92; G06T 3/4007; G06T 2207/10024; G06V 10/56; G06V 10/60
See application file for complete search history.

(56) References Cited

U.S. PATENT DOCUMENTS

| | | |
|---|---|---|
| 12,108,168 B1 | 10/2024 | Pawlik |
| 2008/0030603 A1 | 2/2008 | Masuno et al. |

(Continued)

OTHER PUBLICATIONS

NPL: Results Publication Date Range : Dec. 7, 1992 to Jul. 22, 2025.*

(Continued)

*Primary Examiner* — Quang N Vo
(74) *Attorney, Agent, or Firm* — Sterne, Kessler, Goldstein & Fox P.L.L.C.

(57) ABSTRACT

An image processing circuit for performing local tone mapping (LTM) after image warping. The image processing circuit includes a warping circuit that warps an input image to generate a warped image, and a LTM circuit coupled to the warping circuit. The LTM circuit determines an input color component value for a color component of a pixel in a version of the warped image, determines an output color component value for the color component of the pixel, based on mapping of coordinates of pixels in the warped image to coordinates of pixels in the input image, determines a gain value for the pixel as a ratio of the output color component value relative to the input color component value, and adjusts color component values for color components of the pixel using the gain value to generate adjusted color component values for the color components of the pixel in an output image.

20 Claims, 8 Drawing Sheets

(51) Int. Cl.
  *G06V 10/56*     (2022.01)
  *G06V 10/60*     (2022.01)
  *H04N 9/69*      (2023.01)

(56)                References Cited

U.S. PATENT DOCUMENTS

| | | | |
|---|---|---|---|
| 2011/0141321 A1 | 6/2011 | Tang et al. | |
| 2016/0381335 A1 | 12/2016 | Tao et al. | |
| 2017/0070719 A1 | 3/2017 | Smolic et al. | |
| 2018/0315164 A1* | 11/2018 | Shin | G06T 3/18 |
| 2019/0318451 A1 | 10/2019 | Swami et al. | |
| 2019/0385288 A1 | 12/2019 | Stewart | |
| 2020/0314289 A1* | 10/2020 | Wu | H04N 25/671 |
| 2021/0012755 A1* | 1/2021 | Narasimha | G06T 5/92 |
| 2022/0044349 A1 | 2/2022 | Smirnov et al. | |
| 2022/0053153 A1 | 2/2022 | Guerin et al. | |

OTHER PUBLICATIONS

NPL: InnovationQ+ by IP.com and IEEE, Results Publication Date Range: Dec. 7, 1992 to Jul. 22, 2025.*

* cited by examiner

Interpolation
700

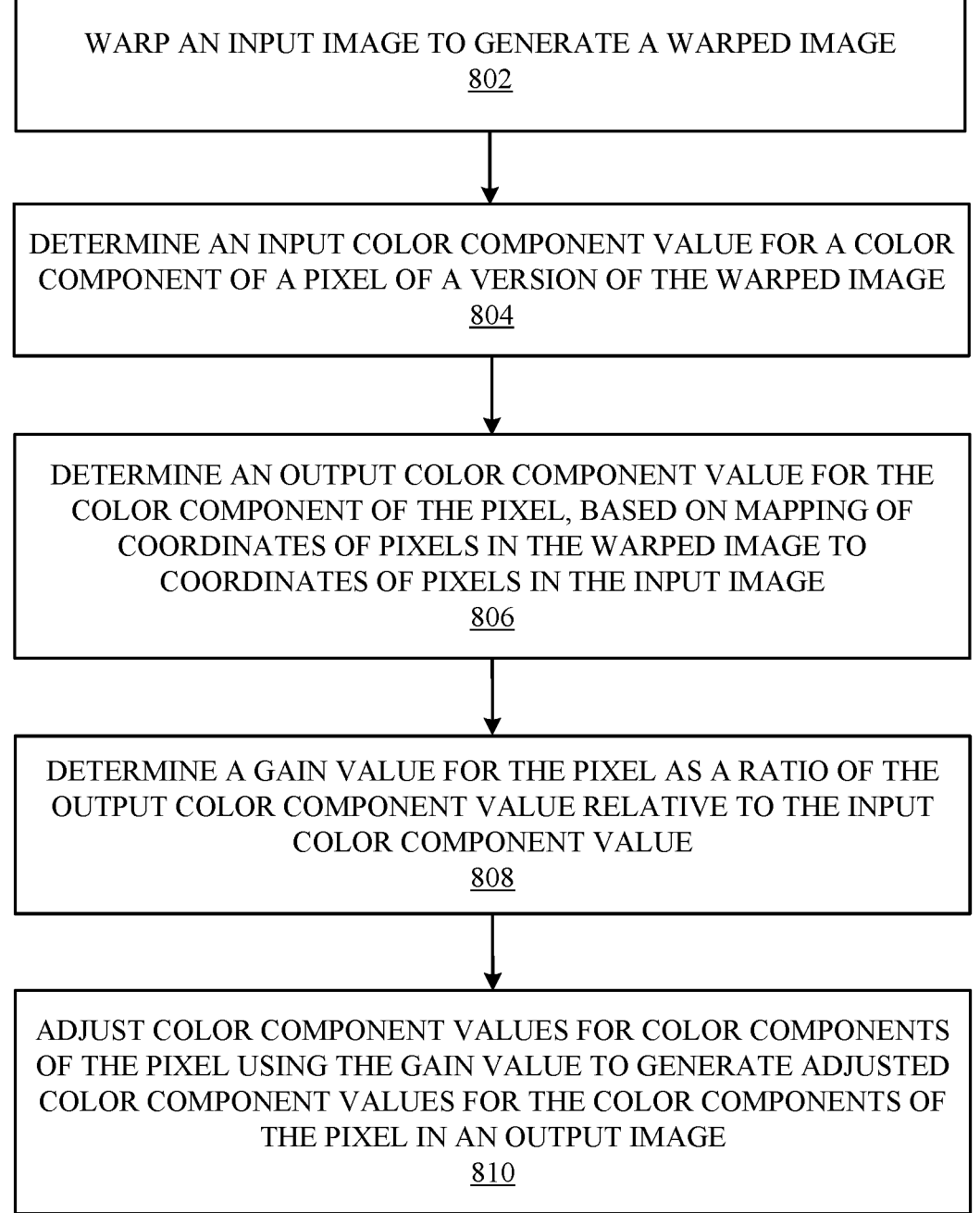

WARP AN INPUT IMAGE TO GENERATE A WARPED IMAGE
802

DETERMINE AN INPUT COLOR COMPONENT VALUE FOR A COLOR COMPONENT OF A PIXEL OF A VERSION OF THE WARPED IMAGE
804

DETERMINE AN OUTPUT COLOR COMPONENT VALUE FOR THE COLOR COMPONENT OF THE PIXEL, BASED ON MAPPING OF COORDINATES OF PIXELS IN THE WARPED IMAGE TO COORDINATES OF PIXELS IN THE INPUT IMAGE
806

DETERMINE A GAIN VALUE FOR THE PIXEL AS A RATIO OF THE OUTPUT COLOR COMPONENT VALUE RELATIVE TO THE INPUT COLOR COMPONENT VALUE
808

ADJUST COLOR COMPONENT VALUES FOR COLOR COMPONENTS OF THE PIXEL USING THE GAIN VALUE TO GENERATE ADJUSTED COLOR COMPONENT VALUES FOR THE COLOR COMPONENTS OF THE PIXEL IN AN OUTPUT IMAGE
810

*FIG. 8*

LOCAL TONE MAPPING OF PROCESSED IMAGE

BACKGROUND

1. Field of the Disclosure

The present disclosure relates to a circuit for processing image data, and more specifically to a back-end scaling circuit with local tone mapping applied after image warping.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to performing one or more image processing algorithms.

SUMMARY

Embodiments relate to an image processing circuit for performing local tone mapping after image warping. The image processing circuit includes a warping circuit configured to warp an input image to generate a warped image, and a local tone mapping (LTM) circuit coupled to the warping circuit. The LTM circuit determines an input color component value for a color component of a pixel in a version of the warped image, determines an output color component value for the color component of the pixel based on mapping of coordinates of pixels in the warped image to coordinates of pixels in the input image, determines a gain value for the pixel as a ratio of the output color component value relative to the input color component value, and adjusts color component values for color components of the pixel using the gain value to generate adjusted color component values for the color components of the pixel in an output image.

BRIEF DESCRIPTION OF THE DRAWINGS

FIG. 8 is a flowchart illustrating a method of local tone mapping performed after image warping, according to one embodiment.

Figure 1:
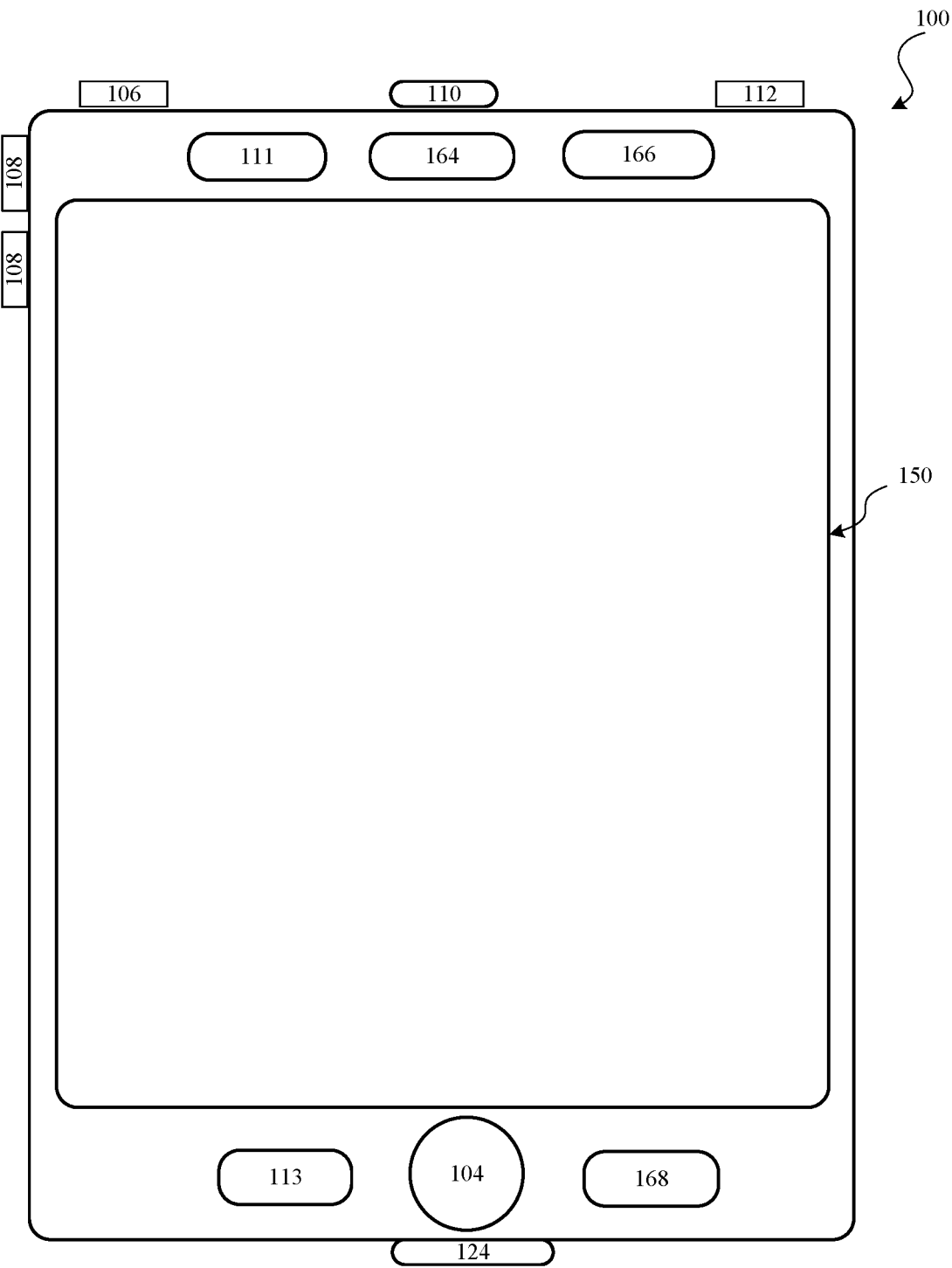
FIG. 1 is a high-level diagram of an electronic device, according to one embodiment.

The figures depict, and the detail description describes various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to an image signal processor with a back-end scaling circuit that includes local tone mapping (LTM) performed after image warping. The back-end scaling circuit includes a warping circuit, and a LTM circuit coupled to an output of the warping circuit. The warping circuit may perform warping (or stabilization) of an input image to generate a warped image. The warped image may be output in the form of multiple warped tiles that are passed onto the LTM circuit. The warping circuit may further provide (e.g., to the LTM circuit) information about mapping of coordinates of pixels in the warped image to coordinates of the pixels in the input image. Based on the mapping information, the LTM circuit may determine an LTM grid for a currently processed pixel of the warped image (e.g., 2×2 LTM grid defined by 4 LTM curves). An input color component value (e.g., luma component) for the currently processed pixel may be interpolated using the LTM grid and spatial interpolation to generate an output color component value (e.g., luma component) for the currently processed pixel. The LTM circuit may determine a gain value for the currently processed pixel as a ratio of the output color component value relative to the input color component value. The LTM circuit may adjust color component values for color components of the pixel using the gain value to generate adjusted color component values for the color components of the pixel in an output image.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with Figure (FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. Additionally or alternatively, image sensors 164 may be associated with different lens configuration. For example, device 100 may include rear image sensors, one with a wide-angle lens and another with as a telephoto lens. Device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
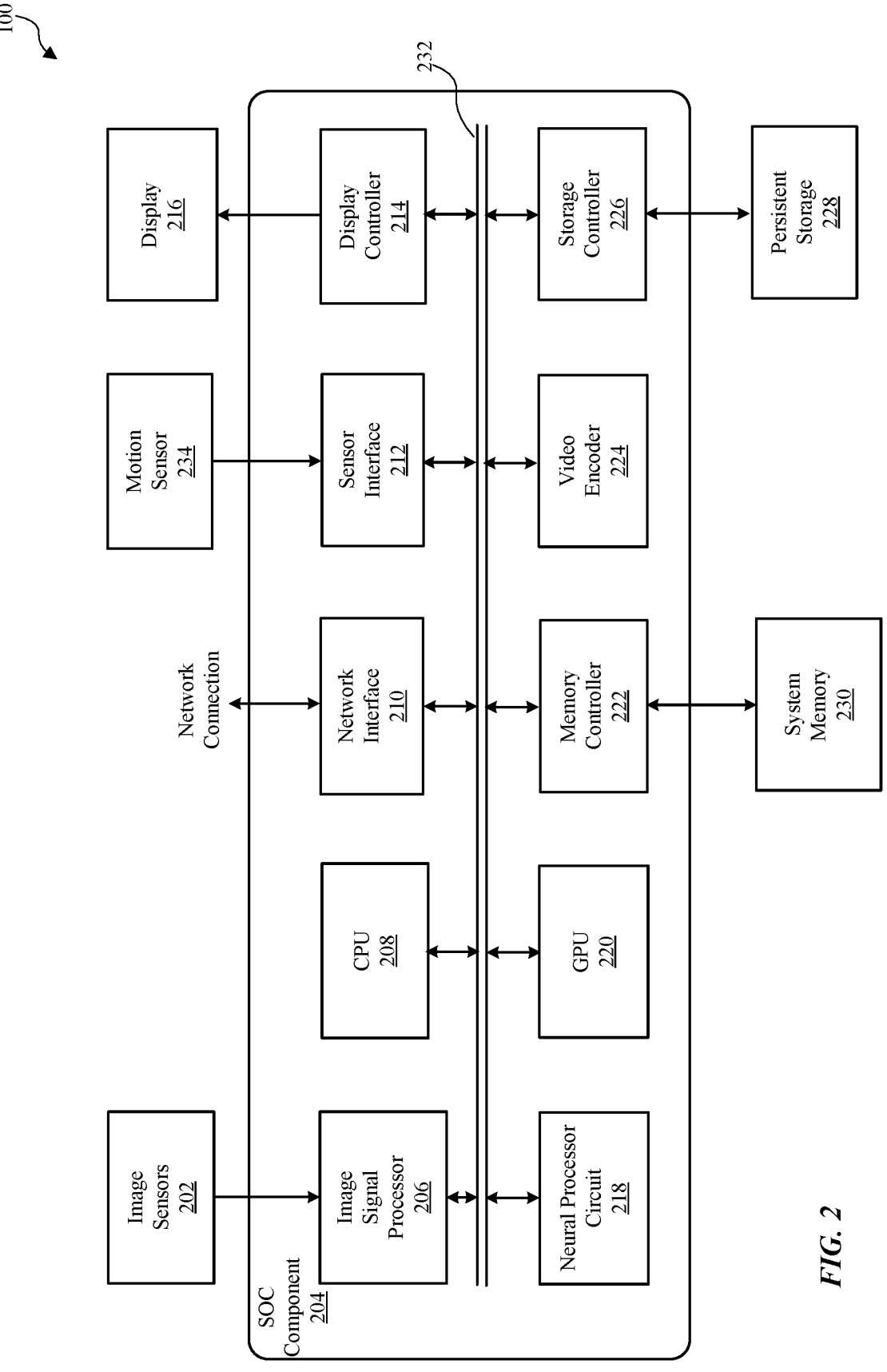
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensors 202, system-on-a chip (SOC) component 204, system memory 230, persistent storage (e.g., flash memory) 228, motion sensor 234, and display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

Image sensors 202 are components for capturing image data. Each of image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). Image sensor 202 may also include optical and mechanical components that assist image sensing components (e.g., pixels) to capture images. The optical and mechanical components may include an aperture, a lens system, and an actuator that controls the focal length of image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, a liquid crystal display (LCD) device or an organic light emitting diode (OLED) device. Based on data received from SOC component 204, display 216 may display various images, such as menus, selected operating parameters, images captured by image sensors 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor unit (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensors 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

GPU 220 is graphics processing circuitry for performing operations on graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from image sensors 202 and processed by ISP 206, and then sent to system memory 230 via bus 232 and memory controller 222. After the image data is stored in system memory 230, it may be accessed by video encoder 224 for encoding or by display 216 for displaying via bus 232.

In another example, image data is received from sources other than image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
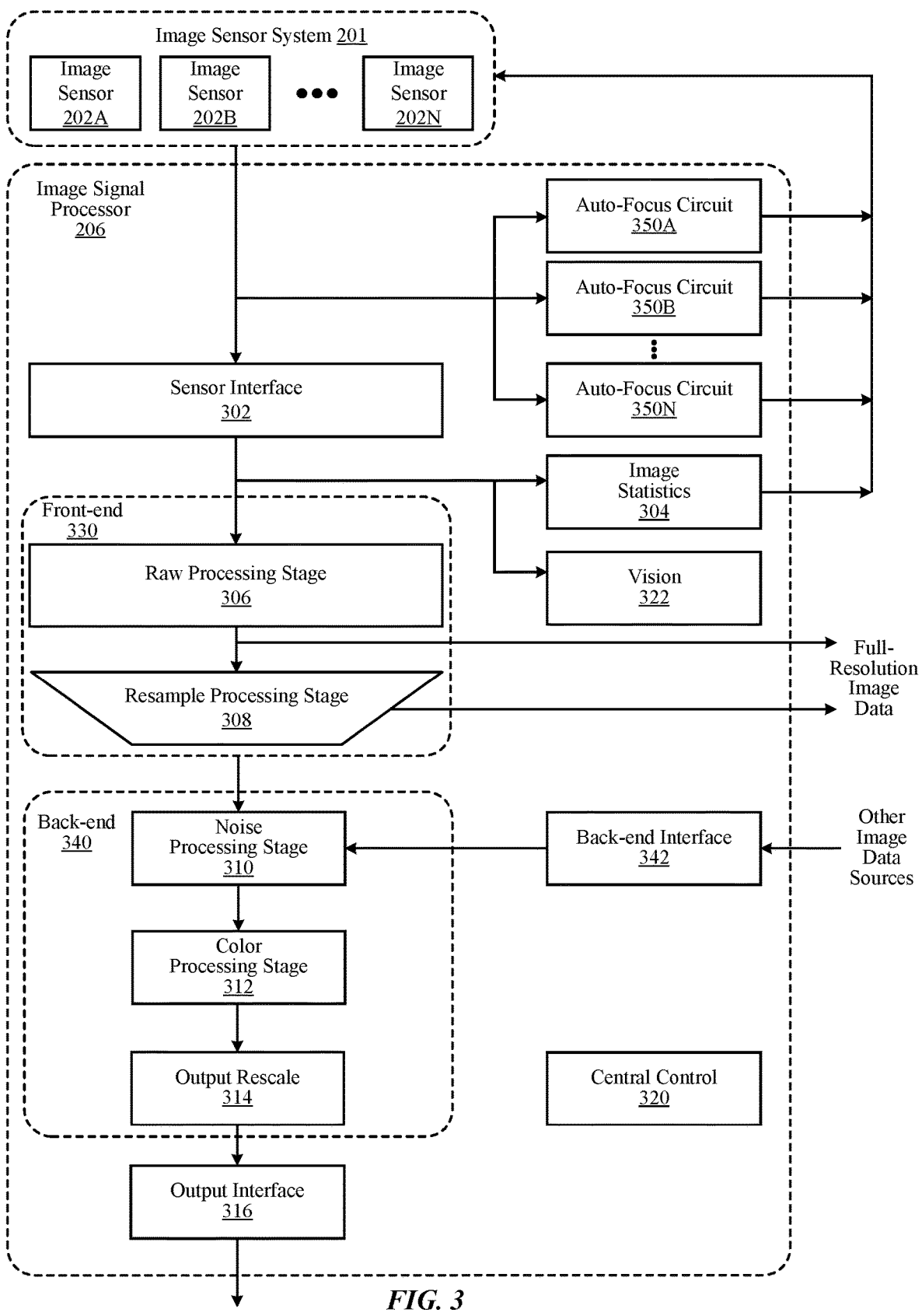
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. Image sensor system 201 may include one or more sub-systems that control image sensors 202 individually. In some cases, each image sensor 202 may operate independently while, in other cases, image sensors 202 may share some components. For example, in one embodiment, two or more image sensors 202 may share the same circuit board that controls the mechanical components of the image sensors (e.g., actuators that change the focal lengths of each image sensor). The image sensing components of image sensor 202 may include different types of image sensing components that may provide raw image data in different forms to ISP 206. For example, in one embodiment, the image sensing components may include multiple focus pixels that are used for auto-focusing and multiple image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control module 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if front-end pipeline stages 330 process two pixels per clock cycle, then raw processing stage 306 operations (e.g., black level compensation, highlight recovery and defective pixel correction) may process two pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale stage 314) may be processed at a reduced rate (e.g., one pixel per clock cycle).

Raw image data captured by image sensors 202 may be transmitted to different components of ISP 206 in different manners. In one embodiment, raw image data corresponding to the focus pixels may be sent to auto-focus circuits 350 while raw image data corresponding to the image pixels may be sent to sensor interface 302. In another embodiment, raw image data corresponding to both types of pixels may simultaneously be sent to both auto-focus circuits 350 and sensor interface 302.

Auto-focus circuits 350 may include hardware circuit that analyzes raw image data to determine an appropriate focal length of each image sensor 202. In one embodiment, the raw image data may include data that is transmitted from image sensing pixels that specializes in image focusing. In another embodiment, raw image data from image capture pixels may also be used for auto-focusing purpose. Auto-focus circuit 350 may perform various image processing operations to generate data that determines the appropriate focal length. The image processing operations may include cropping, binning, image compensation, scaling to generate data that is used for auto-focusing purpose. The auto-focusing data generated by auto-focus circuits 350 may be fed back to image sensor system 201 to control the focal lengths of image sensors 202. For example, image sensor 202 may include a control circuit that analyzes the auto-focusing data to determine a command signal that is sent to an actuator associated with the lens system of image sensor 202 to change the focal length of image sensor 202. The data generated by auto-focus circuits 350 may also be sent to other components of ISP 206 for other image processing purposes. For example, some of the data may be sent to image statistics module 304 to determine information regarding auto-exposure.

Auto-focus circuits 350 may be individual circuits that are separate from other components such as image statistics module 304, sensor interface 302, front-end 330 and back-end 340. This allows ISP 206 to perform auto-focusing analysis independent of other image processing pipelines. For example, ISP 206 may analyze raw image data from image sensor 202A to adjust the focal length of image sensor 202A using auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of image sensor 202. Device 100 may perform auto focusing for different image sensors 202 even if one or more image sensors 202 are not in active use. This allows a seamless transition between two image sensors 202 when device 100 switches from one image sensor 202 to another. For example, in one embodiment, device 100 may include a wide-angle camera and a telephoto camera as a dual back camera system for photo and image processing. Device 100 may display images captured by one of the dual cameras and may switch between the two cameras from time to time. The displayed images may seamlessly transition from image data captured by one image sensor 202 to image data captured by another image sensor 202 without waiting for second image sensor 202 to adjust its focal length because two or more auto-focus circuits 350 may continuously provide auto-focus data to image sensor system 201.

Raw image data captured by different image sensors 202 may also be transmitted to sensor interface 302. Sensor interface 302 receives raw image data from image sensors 202 and processes the raw image data into an image data processable by other stages in the pipeline. Sensor interface 302 may perform various preprocessing operations, such as image cropping, binning or scaling to reduce image data size. In some embodiments, pixels are sent from image sensors 202 to sensor interface 302 in raster order (e.g., horizontally, line by line). The subsequent processes in the pipeline may also be performed in raster order and the result may also be output in raster order. Although only a single image sensor system 201 and a single sensor interface 302 are illustrated in FIG. 3, when more than one image sensor system is provided in device 100, a corresponding number of sensor interfaces may be provided in ISP 206 to process raw image data from each image sensor system.

Front-end pipeline stages 330 process image data in raw or full-color domains. Front-end pipeline stages 330 may include, but are not limited to, raw processing stage 306 and resample processing stage 308. A raw image data may be in a Bayer raw image format, for example. In the Bayer raw image format, pixel data with values specific to a particular color (instead of all colors) is provided in each pixel. In an image capturing sensor, image data is typically provided in the Bayer pattern. Raw processing stage 306 may process image data in the Bayer raw image format.

The operations performed by raw processing stage 306 include, but are not limited, sensor linearization, black level compensation, fixed pattern noise reduction, defective pixel correction, raw noise filtering, lens shading correction, white balance gain, highlight recovery, and chromatic aberration recovery (or correction). Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in the Bayer pattern).

Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in the Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing. In another embodiment, resample processing stage 308 concerts RBD format into RGB format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics module 304. In such embodiments, each statistic module may be programmed by central control module 320 to collect different information for the same or different image data.

Vision module 322 performs various operations to facilitate computer vision operations at CPU 208 such as facial detection in image data. Vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 202 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by central control module 320) may be bilinearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three-dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale stage 314 may resample, transform, and correct distortion on the fly as ISP 206 processes image data. Output rescale stage 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale stage 314 may apply transforms to image data as it is processed at output rescale stage 314. Output rescale stage 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale stage 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, the output rescale stage 314 may implement a table of piecewise perspective transforms encoded as digital difference analyzer (DDA) steppers to perform a per-pixel perspective transformation between an input image data and output image data in order to correct artifacts and motion caused by sensor motion during the capture of the image frame. Output rescale may provide image data via output interface 316 to various other components of device 100, as discussed above in relation to FIGS. 1 and 2.

In various embodiments, the functionally of components 302 through 350 may be performed in a different order than the order implied by the order of these functional units in the image processing pipeline illustrated in FIG. 3 or may be performed by different functional components than those illustrated in FIG. 3. Moreover, the various components as described in FIG. 3 may be embodied in various combinations of hardware, firmware, or software.

Example Back-End Scaling Circuit with Local Tone Mapping

Figure 4:
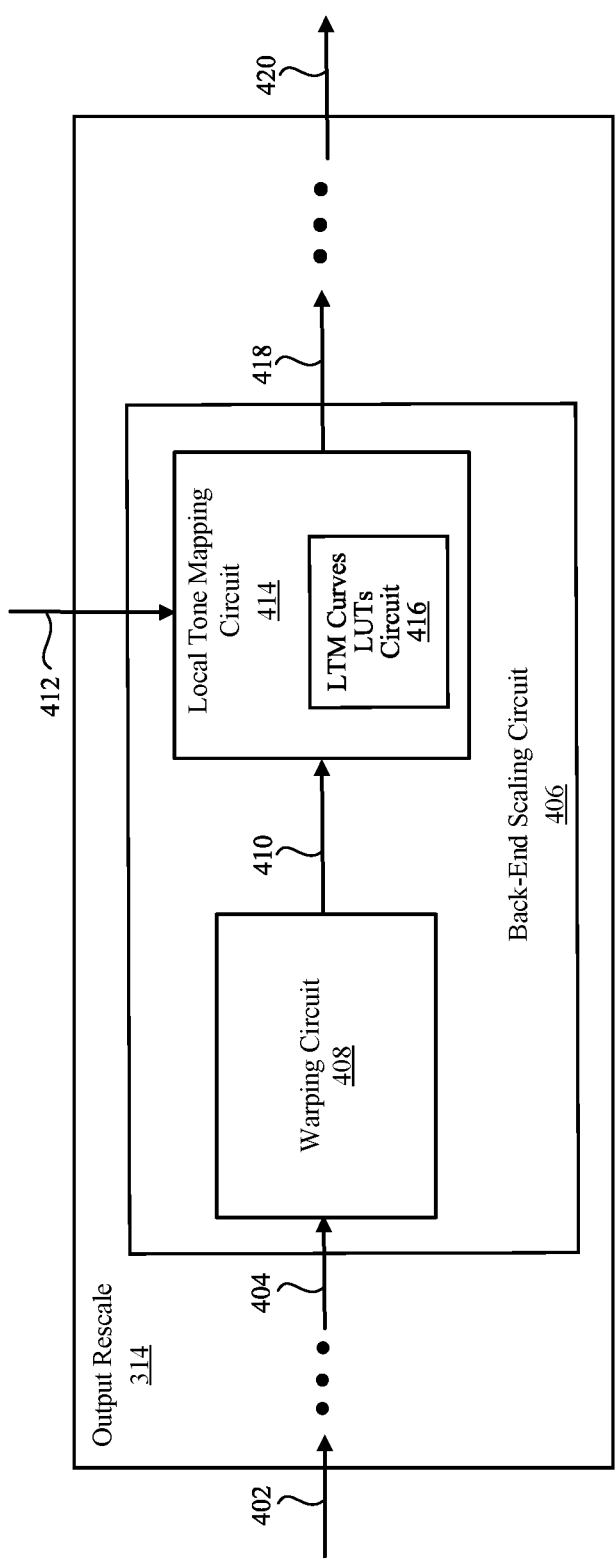
FIG. 4 is a block diagram illustrating a back-end scaling circuit with a local tone mapping (LTM) circuit as part of an output rescale stage, according to one embodiment.

FIG. 4 is a block diagram illustrating a back-end scaling circuit 406 with a LTM circuit 414 as part of output rescale stage 314, according to one embodiment. A portion of output rescale stage 314 shown in FIG. 4 further includes a warping circuit 408 having an output coupled to an input of LTM circuit 414. Output rescale stage 314 includes additional components not shown in FIG. 4. Moreover, some components of output rescale stage 314 described in relation to FIG. 4 may be embodied in various combinations of hardware, firmware, or software.

Image data 402 (e.g., in YCbCr 4:2:2 or YCbCr 4:2:0 color format) may be passed onto output rescale stage 314, e.g., from color processing stage 312. Image data 402 may be processed within output rescale stage 314 to generate an input image 404 in the form of two-dimensional array of pixels. Pixels of input image 404 may be passed into warping circuit 408 that warps input image 404 (e.g., for stabilization of input image 404) to generate a two-dimensional array of pixels in a warped image 410. The two-dimensional array of pixels in warped image 410 may be passed onto LTM circuit 414 for local tone mapping.

LTM circuit 414 may apply spatially varying LTM curves on color component values of pixels in warped image 410 to generate adjusted color component values of pixels in an output image 418. Corresponding values (e.g., data samples) of the spatially varying LTM curves may be stored in LUTs of LTM curves look-up tables (LUTs) circuit 416. For example, samples for each LTM curve may be stored in a respective LUT of LTM curves LUTs circuit 416. LTM circuit 414 may perform interpolation (e.g., uniform, or non-uniform interpolation) of a two-dimensional grid of LTM curves from LTM curves LUTs circuit 416 such that smoothly varying LTM curves are applied across color component values of pixels in warped image 410. Note that LTM circuit 414 operates on warped image 410; however, the two-dimensional grid of LTM curves is defined on coordinates of pixels in input image 404. Hence, LTM circuit 414 uses information 412 about mapping of each coordinate (e.g., X and Y locations) of each pixel in warped image 410 to a corresponding coordinate (e.g., X and Y locations) of that pixel in input image 404 to select a corresponding subset of LTM curves (e.g., the two-dimensional grid of LTM curves) from LTM curves LUTs circuit 416. Mapping information 412 provided to LTM circuit 414 may be generated by warping circuit 408, e.g., for each raw image frame. Alternatively, mapping information 412 may be fetched onto LTM circuit 414 from, e.g., system memory 230 via a direct memory access (DMA) circuit (not shown in FIG. 4). One or more additional components of output rescale stage 314 (not shown in FIG. 4) may process output image 418 to generate a final output image 420 that can be passed onto, e.g., output interface 316. More details about a structure and operation of LTM circuit 414 are provided in relation to FIGS. 5-8.

Figure 5:
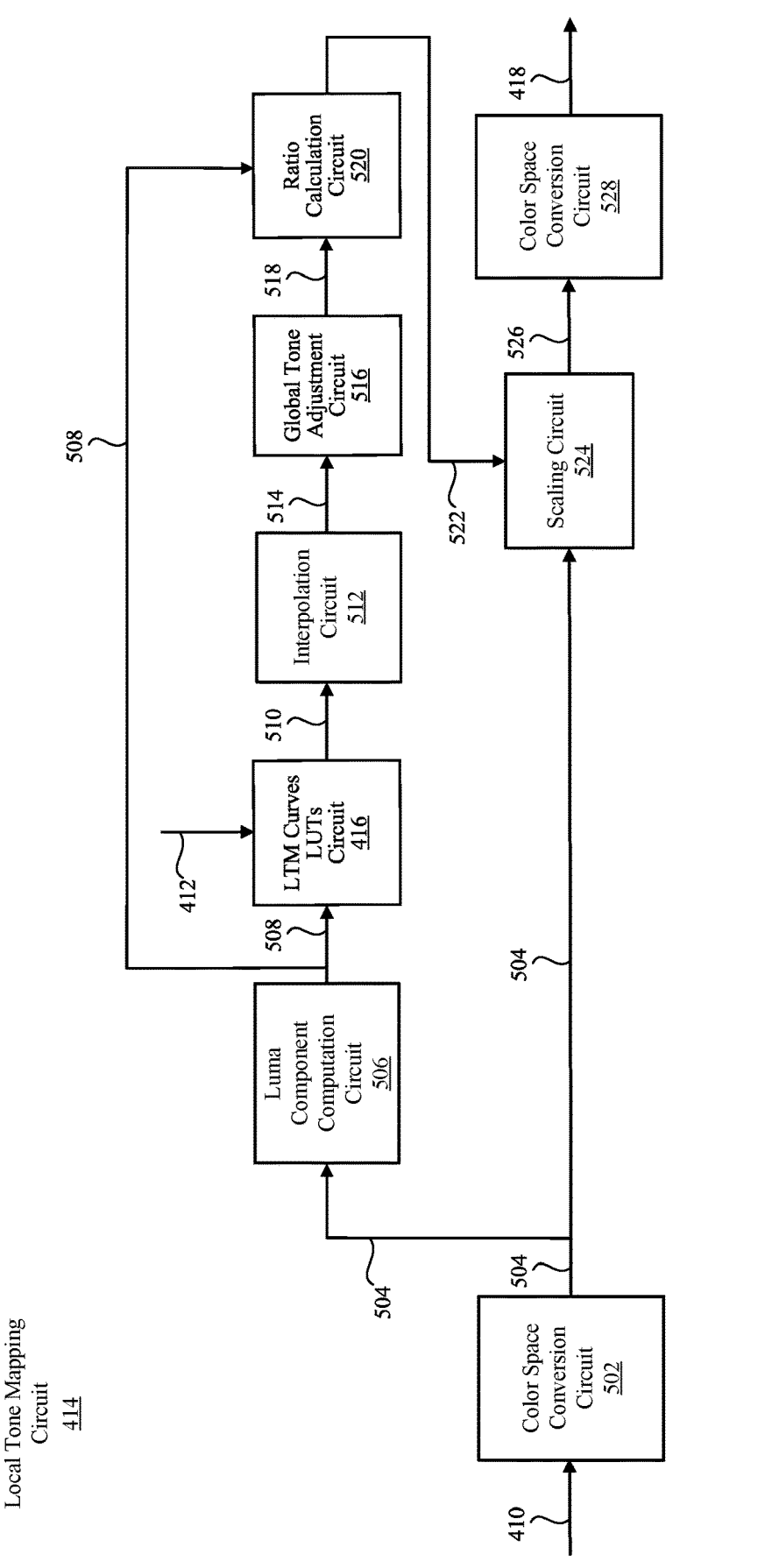
FIG. 5 is a block diagram illustrating a detailed view of the LTM circuit in FIG. 4, according to one embodiment.

FIG. 5 is a block diagram illustrating a detailed view of LTM circuit 414, according to one embodiment. LTM circuit 414 may include a color space conversion circuit 502, a luma component computation circuit 506 coupled to an output of color space conversion circuit 502, LTM curves LUTs circuit 416 coupled to an output of luma component computation circuit 506, an interpolation circuit 512 coupled to outputs of LTM curves LUTs circuit 416, a global tone adjustment circuit 516 coupled to an output of interpolation circuit 512, a ratio calculation circuit 520 coupled to an output of global tone adjustment circuit 516, a scaling circuit 524 coupled to outputs of color space conversion circuit 502 and ratio calculation circuit 520, and a color space conversion circuit 528 coupled to an output of scaling circuit 524. LTM circuit 414 may include more or fewer components than what is shown in FIG. 5. Moreover, the various components of LTM circuit 414 described in relation to FIG. 5 may be embodied in various combinations of hardware, firmware, or software.

Color space conversion circuit 502 may perform color space conversion of pixels in warped image 410 to generate a color converted version of warped image 504. Color space conversion circuit 502 may perform color space conversion of warped image 410 in YCbCr color format (e.g., YCbCr 4:4:4 color format) to color converted version 504 of, e.g., RGB color format. Warped image 410 may be originally in YCbCr 4:2:2 color format or YCbCr 4:2:0 color format, with separate Y and CrCb sample streams (e.g., skewed in time). Prior to color space conversion, color space conversion circuit 502 may perform up-sampling of CrCb component values in warped image 410 to obtain a version of warped image 410 in YCbCr 4:4:4 color format. The missing chroma components in warped image 410 may be filled in by duplicating the chroma values in warped image 410, e.g., to the left horizontally and/or to the top vertically. For example, when warped image 410 is in YCbCr 4:2:2 color format, the chroma values in warped image 410 may be replicated horizontally; and when warped image 410 is in YCbCr 4:2:0 color format, the chroma values in warped image 410 may be replicated both horizontally and vertically. After the up-sampling is performed, the Y and CrCb streams may be aligned temporally and spatially, and then merged by joining corresponding Y and up-sampled CC streams together thus creating YCrCb 4:4:4 pixels.

Color space conversion circuit 502 may first convert the YCC 4:4:4 pixel values in warped image 410 using a 3×3 color space conversion matrix and clipping to obtain pixel values (e.g., in RGB color format) of color converted version of warped image 504. In addition to clipping, color space conversion circuit 502 may further perform gamma correction (e.g., by applying corresponding values from a gamma function LUT in color space conversion circuit 502) or linear correction (e.g., by applying corresponding values from a linear function LUT in color space conversion circuit 502) to generate the pixel values of color converted version of warped image 504. Alternatively, the conversion based on the 3×3 color space conversion matrix in color space conversion circuit 502 may be bypassed, and the local tone mapping may be applied to the version of warped image 410 in, e.g., YCbCr 4:4:4 color format (instead of RGB color format). Pixel values of color converted version 504 may be passed onto luma component computation circuit 506, as well as onto scaling circuit 524.

Luma component computation circuit 506 may determine an input luma component value 508 for a pixel (e.g., currently processed pixel) in color converted version 504. Input luma component value 508 for the currently processed pixel in color converted version 504 may be passed onto inputs of LTM curves LUTs circuit 416.

A corresponding subset of LTM curves represented by a corresponding subset of LUTs in LTM curves LUTs circuit 416 may be determined based on mapping information 412 for the currently processed pixel. The determined subset of LTM curves may represent a two-dimensional grid of LTM curves (e.g., 2×2 grid of four LTM curves). Input luma component value 508 for the currently processed pixel may be provided as an input entry to each LUT in the corresponding subset of LUTs in LTM curves LUTs circuit 416. The corresponding subset of LUTs in LTM curves LUTs circuit 416 may then output interpolated luma values 510 for the currently processed pixel generated based on the input entry to each LTM curve in the corresponding subset of LUTs in LTM curves LUTs circuit 416. For example, for one input luma component value 508 for the currently processed pixel, four interpolated luma values 510 for the currently processed pixel may be output by applying interpolation of each of 2×2 nearest LTM curves (e.g., represented by four LUTs in LTM curves LUTs circuit 416). Interpolated luma values 510 may be passed onto interpolation circuit 512.

For efficient hardware implementation, mapping information 412 for only one (x,y) pixel coordinate may be used to determine which two-dimensional grid of LTM curves is needed, e.g., which four LTM curves for the 2×2 LTM grid need to be fetched from LTM curves LUTs circuit 416 for a group of pixels (e.g., group of four pixels) in color converted version 504. The fetched LTM curves (e.g., fetched LUT samples) for the group of pixels may be stored into a grid buffer (not shown in FIG. 5), which may be part of LTM curves LUTs circuit 416. Note that the pixels in the group may cross over a grid boundary. The pixels in the group may originate from a straight line in color converted version 504. Thus, a mean value of center pixel coordinates (e.g., mean of two center pixel coordinates) may be used as the (x,y) pixel coordinate in mapping information 412 to fetch a subset of LTM curves (e.g., four LTM curves for the 2×2 LTM grid) from LTM curves LUTs circuit 416. Therefore, at any cycle, only the subset of LTM curves from LTM curves LUTs circuit 416 (e.g., 2×2 LTM curves) in the LTM grid space are needed to process pixels in color converted version 504.

Interpolation circuit 512 may perform spatial interpolation (e.g., bilinear interpolation) of interpolated luma values 510 for the currently processed pixel (e.g., four interpolated luma values 510) to generate an output luma component value 514 for the currently processed pixel in color converted version 504. Output luma component value 514 may be passed onto global tone adjustment circuit 516.

Global tone adjustment circuit 516 may apply global tone adjustment to output luma component value 514 of the currently processed pixel to generate a corrected color component value 518 for the currently processed pixel in color converted version 504. Additionally or alternatively, global tone adjustment circuit 516 may perform black-level compensation and/or gamma correction on output luma component value 514 of the currently processed pixel to generate corrected color component value 518 of the currently processed pixel. Global tone adjustment circuit 516 may include a global LUT that implements a global mapping of locally tone-mapped pixel values. The global LUT may have finer sampling than spatially varying LTM curves from LTM curves LUTs circuit 416, which provides more control to the global mapping performed by global tone adjustment circuit 516. For example, the global LUT may store 257 entries of 16-bit values, and each 16-bit value may represent a corresponding corrected color component value 518, e.g., a corresponding output value determined by global tone adjustment circuit 516. The input entries (that correspond to output luma component value 514) of the global LUT may be evenly distributed within a range of output luma component values 514. When output luma component value 514 falls between two of the input entries of the global LUT, global tone adjustment circuit 516 outputs corrected color component value 518 determined by linearly interpolating two output values of the global LUT that correspond to the two input entries. Corrected color component value 518 may be passed onto ratio calculation circuit 520.

Ratio calculation circuit 520 may determine a gain value 522 for the currently processed pixel (e.g., per pixel gain) based on corrected color component value 518. For example, ratio calculation circuit 520 may determine gain value 522 for the currently processed pixel as a ratio of corrected color component value 518 relative to input luma component value 508. After computing the ratio, ratio calculation circuit 520 may clip the computed ratio to obtain gain value 522 for the currently processed pixel within a defined range. Gain value 522 for the currently processed pixel in color converted version 504 may be passed onto scaling circuit 524.

Scaling circuit 524 may adjust color component values for color components of the currently processed pixel in color converted version 504 using gain value 522 to generate adjusted color component values 526 for the color components of the currently processed pixel in an output image. For example, scaling circuit 524 may scale each color component value of the currently processed pixel in color converted version 504 using gain value 522 for the currently processed pixel to generate a respective adjusted color component value 526 of the currently processed pixel in the output image. Adjusted color component values 526 of the currently processed pixel may be passed onto color space conversion circuit 528.

Color space conversion circuit 528 may perform color space conversion of adjusted color component values 526 of each pixel to generate pixel values (e.g., rounded unsigned 10-bit color component values) of color converted version of output image 418 having the same color format as input image 410. For example, color space conversion circuit 528 may perform color space conversion of adjusted color component values 526 of each pixel from RGB color format to YCrCb color format (e.g., YCbCr 4:2:2 color format or YCbCr 4:2:0 color format) of color converted version of output image 418 (e.g., the same YCrCb color format of input image 410). Color space conversion circuit 528 may drop the extra chroma component values that were included in color space conversion circuit 502 to obtain color converted version 504 in YCbCr 4:4:4 color format. In some embodiments, when color space conversion circuit 502 is bypassed, color space conversion circuit 528 is also bypassed.

Figure 6:
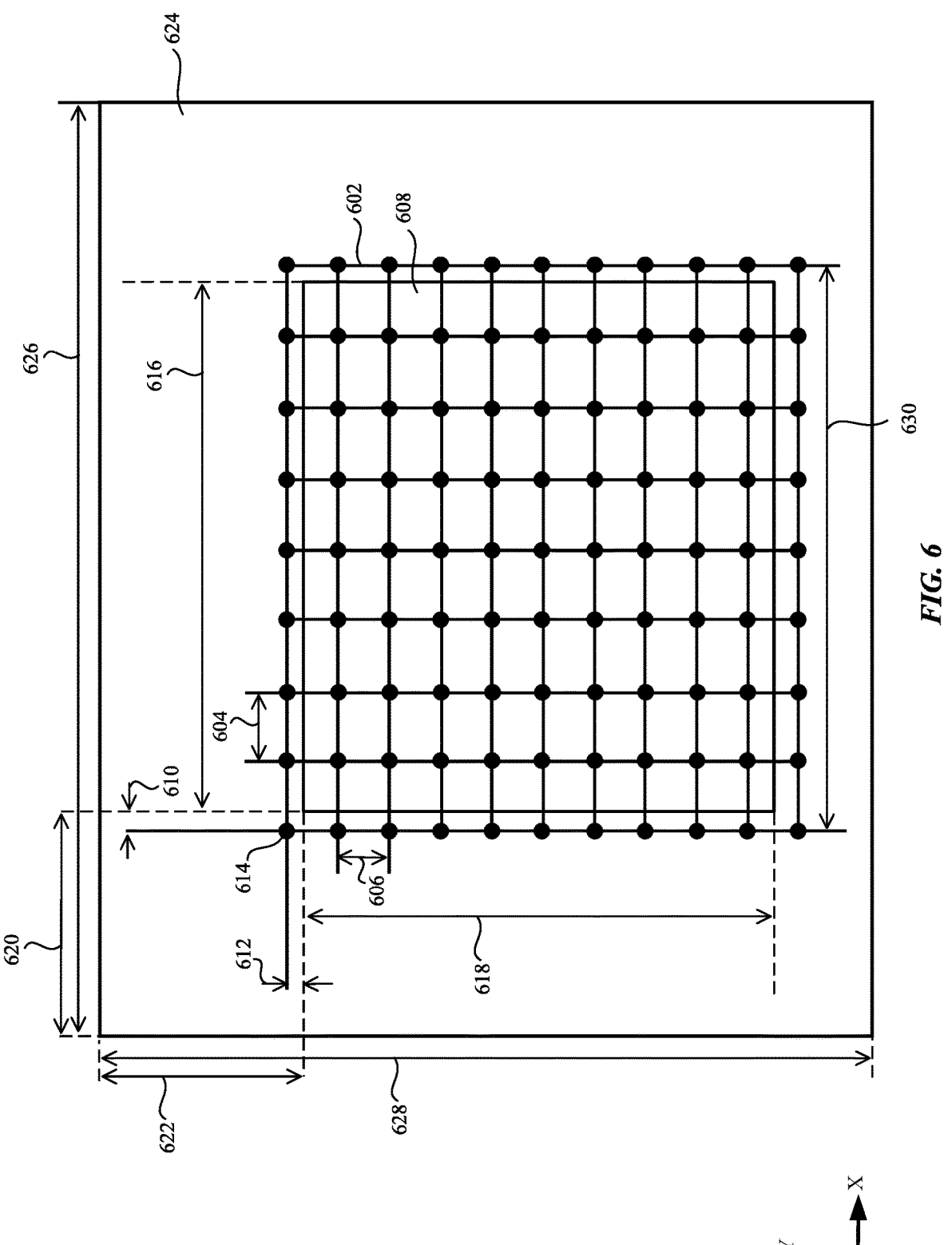
FIG. 6 is a conceptual diagram illustrating a two-dimensional grid of LTM curves with data samples stored in LUTs as part of the LTM circuit in FIG. 4, according to one embodiment.

FIG. 6 is a conceptual diagram illustrating a two-dimensional grid of LTM curves with data samples stored in LUTs as part of LTM curves LUTs circuit 416, according to one embodiment. As aforementioned in relation to FIG. 5, input luma component values 508 for pixels in color converted version 504 may be used to determine gain values 522 for the pixels in color converted version 504 through applying spatially varying LTM curves fetched from LTM curves LUTs circuit 416 as LUT samples. The LTM curves may be represented as data samples stored in LUTs at configurable (e.g., software programmable) grids. Dimensions and coordinates of the grids may be defined in a coordinate system of an input surface (e.g., input image 404) prior to warping (e.g., at warping circuit 408). Thus, all the look-up operations performed as part of LTM curves LUTs circuit 416 to determine which LTM curves would be fetched are in accordance with original input coordinates (e.g., prior to warping). A total number of LTM curves in horizontal direction (e.g., in X direction) may be less than or equal to a configurable number, e.g., 33 LTM curves in horizontal direction may be stored in LUTs of LTM curves LUTs circuit 416.

The LTM curves can be specified as a two-dimensional grid 602 of LTM curves. The LTM curves may be distributed at a fixed horizontal interval 604 (e.g., IntervalX) and a fixed vertical interval 606 (e.g., IntervalY). A spatial offset between the top left grid and an LTM active region 608 may be specified by an offset 610 along X direction (e.g., GridOffsetX) and an offset 612 along Y direction (e.g., GridOffsetY). The offset 610 and the offset 612 may be determined as a corresponding spacing (e.g., in pixels) from a base 614 to a corresponding edge of LTM active region 608 along X and Y directions, respectively. When a corresponding offset 610, 612 is positive or equal to 0, the top left grid point is outside (or exactly on the border) of LTM active region 608 in a corresponding spatial dimension; and when the corresponding offset 610, 612 is negative, the top left grid point is inside of the LTM active region 608 in the corresponding spatial dimension. The offsets 610 and 612 can have different signs. A width 616 of LTM active region 608 and a length 618 of LTM active region 608 may be configurable (e.g., software programmable). A spatial interval between the LTM curves may take non-integer values, and may be larger than or equal to, e.g., 32 pixels in both horizontal and vertical directions. The spatial intervals may be expressed as, e.g., 32-bit fractional reciprocals. For example, ReciplIntervalX=$2^{32}$/IntervalX, where IntervalX is the fixed horizontal interval 604 (e.g., spacing in pixels) between two adjacent grid points along horizontal direction.

A horizontal grid size (e.g., GridSizeX) and a vertical grid size (e.g., Grainsizes) may be configurable (e.g., software programmable). Both the horizontal grid size and the vertical grid size may be at least two (e.g., for 2×2 LTM grid). The horizontal grid size and the vertical grid size may be small enough to ensure that all the grid points are inside LTM active region 608. For example, the horizontal grid size (e.g., GridSizeX) is less than or equal to 33, and the vertical grid size (e.g., GridSizeY) is less than or equal to 129, including replicated grid points.

A start location 620 of LTM active region 608 along horizontal direction and a start location 622 of LTM active region 608 along vertical direction may be configurable (e.g., software programmable). The start locations 620, 622 may be defined as spacings (e.g., in pixels) along X and Y directions of LTM active region 608 relative to a raw frame 624. Raw frame 624 may have a raw frame width 626 along X direction and a raw frame height 628 along Y direction.

Data for the LMT curves may be originally stored in, e.g., system memory 230. Each LTM may be represented with, e.g., 65 control points (or data samples) that are stored in a respective LUT in LTM curves LUTs circuit 416. Each LUT in LTM curves LUTs circuit 416 may have, e.g., 65 entries of 16-bit values. The control points stored in the LUT may represent output levels that correspond to input levels (e.g., input luma component values 508). A memory stride value 630 and an address for a start location for the grid of LMT curves may be configurable (e.g., software programmable). The memory stride value 630 may be, e.g., a 64-byte increment that represents a distance in bytes between two vertically adjacent grid LTM curves. The spatial interval between the LTM curves may take non-integer values, and may be larger than or equal to, e.g., 32 pixels in both horizontal and vertical directions.

Figure 7:
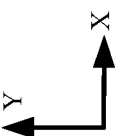
FIG. 7 is a conceptual diagram illustrating an example interpolation of color component values implemented as part of the LTM circuit in FIG. 4, according to one embodiment.

FIG. 7 is a conceptual diagram illustrating an example interpolation 700 of color component values implemented as part of LTM circuit 414, according to one embodiment. The interpolation of color component values illustrated in FIG. 7 may be performed as part of LTM curves LUTs circuit 416 and interpolation circuit 512 in FIG. 5. The interpolation illustrated in FIG. 7 represents a spatially varying LUT-based interpolation (e.g., luminance interpolation) achieved by performing linear interpolation of four nearest LTM curves (e.g., fetched from LTM curves LUTs circuit 416), which is followed by a spatial interpolation of the interpolated values (e.g., interpolation performed at interpolation circuit 512).

As aforementioned in relation to FIG. 6, each LUT fetched from LTM curves LUTs circuit 416 may have 65 sampling points that represent a corresponding LTM curve. The LUTs fetched from LTM curves LUTs circuit 416 may be sampled in a uniform manner or a non-uniform manner of a configurable nonuniformity type (e.g., logarithmic, exponential, etc.). Points L0, L1, L2 and L3 represent four sampling points (e.g., outputs) of the LUTs fetched from LTM curves LUTs circuit 416 that correspond to the top-left, top-right, bottom left, and bottom-right positions, respectively, relative to a position of the currently processed pixels. The 2×2 LTM grid illustrated in FIG. 7 has a first grid size 702 (e.g., size along X direction) and a second grid size 704 (e.g., size along Y direction), which may depend on a number of LUTs in LTM curves LUTs circuit 416. The first and second grid sizes 702, 704 may represent spacing (e.g., in pixels) along X and Y directions between two adjacent grid points (e.g., spatial intervals between LTM curves).

Output interpolated luma values 510 associated with the LUTs fetched from LTM curves LUTs circuit 416 (e.g., L0_int, L1_int, L2_int, and L3_int values) may be determined (e.g., as part of LTM curves LUTs circuit 416) by performing linear interpolation (e.g., luminance interpolation) of the sampling points L0, L1, L2 and L3. Once the luminance interpolation is performed (e.g., at LTM curves LUTs circuit 416), the spatial interpolation (e.g., bilinear interpolation) may be performed at interpolation circuit 512. Interpolation circuit 512 may perform bi-linear spatial interpolation of output interpolated luma values 510 (e.g., L0_int, L1_int, L2_int, and L3_int values) to determine output luma component value 514 (e.g., value L in FIG. 7) for the currently processed pixel in color converted version 504. Output luma component value 514 (e.g., the value L) may have a first normalized coordinate 706 (e.g., along X direction) and a second normalized coordinate 708 (e.g., along Y direction) in the LTM grid space (e.g., 2×2 LTM grid space). In some embodiments, the linear interpolation (e.g., luminance interpolation) of the sampling points L0, L1, L2 and L3 may be also performed as part of interpolation circuit 512.

Example Process of Local Tone Mapping after Image Warping

FIG. 8 is a flowchart illustrating a method of local tone mapping performed by an image processor (e.g., ISP 206) after image warping, according to one embodiment. The image processor warps 802 (e.g., via warping circuit 408) an input image to generate a warped image. The warped image may be generated as multiple warped tiles. The image processor (e.g., via warping circuit 408) may generate information about mapping of coordinates of pixels in the warped image to coordinates of pixels in the input image.

The image processor determines 804 (e.g., via LTM circuit 414) an input color component value for a color component of a pixel in a version of the warped image. The image processor may perform color space conversion of pixels in the warped image to generate a color converted version of the warped image. The image processor may determine an input luma component value for a pixel in the color converted version of the warped image.

The image processor determines 806 (e.g., via LTM circuit 414) an output color component value for the color component of the pixel, based on the mapping of coordinates of pixels in the warped image to coordinates of pixels in the input image. The image processor may determine, for the pixel in the color converted version based on the mapping, a corresponding subset of LTM curves in one or more LUTs. The input luma component value for the pixel in the color converted version may be provided as an input entry to each LTM curve of the corresponding subset of LTM curves. The image processor may output interpolated luma values for the pixel in the color converted version generated based on the input entry to each LTM curve of the corresponding subset of LTM curves. The image processor may perform spatial interpolation of the interpolated luma values to generate the output color component value for the pixel, the output color component value representing an output luma component value for the pixel in the color converted version. The image processor may perform, e.g., bilinear interpolation of the interpolated luma values to generate the output color component value for the pixel.

The image processor determines 808 (e.g., via LTM circuit 414) a gain value for the pixel as a ratio of the output color component value relative to the input color component value. The image processor may determine the gain value for the pixel as a ratio of the output luma component value relative to the input luma component value. The image processor may apply at least one of global tone adjustment, black-level compensation, and gamma correction on the output color component value for the pixel to generate a corrected color component value for the pixel. The image processor may determine the gain value for the pixel further based on the corrected color component value, e.g., as a ratio of the corrected color component value relative to the input color component value.

The image processor adjusts 810 (e.g., via LTM circuit 414) color component values for color components of the pixel using the gain value to generate adjusted color component values for the color components of the pixel in an output image. The image processor may perform color space conversion of pixels in the output image to generate a color converted version of the output image having a same format as the input image.

Embodiments of the process as described above with reference to FIG. 8 are merely illustrative. Moreover, sequence of the process may be modified or omitted.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An image processing circuit, comprising:
a local tone mapping (LTM) circuit configured to receive a processed image generated from an input image, the LTM circuit comprising:
a first circuitry to determine an input color component value for a color component of a pixel in a version of the processed image having a color component value for the color component of the pixel in the version of the processed image;
a second circuitry to determine an output color component value for the color component of the pixel in the version of the processed image, based on mapping of coordinates of pixels in the processed image to coordinates of pixels in the input image;
a third circuitry to determine a gain value for the pixel in the version of the processed image as a ratio of the output color component value relative to the input color component value; and
a fourth circuitry to adjust the color component value for the color component of the pixel in the version of the processed image using the gain value to generate an adjusted color component value for the color component of the pixel in an output image.

2. The image processing circuit of claim 1, wherein the LTM circuit further comprises:
a fifth circuitry to perform color space conversion of pixels in the processed image to generate a color converted version of the processed image; and
a sixth circuitry to determine an input luma component value for a pixel in the color converted version of the processed image.

3. The image processing circuit of claim 2, wherein the LTM circuit further comprises:
a seventh circuitry to determine, for the pixel in the color converted version and based on the mapping, a corresponding subset of LTM curves in a look-up table (LUT);
an eighth circuitry to provide the input luma component value for the pixel in the color converted version as an input entry to each LTM curve of the corresponding subset of LTM curves; and
a ninth circuitry to output interpolated luma values for the pixel in the color converted version generated based on the input entry to each LTM curve of the corresponding subset of LTM curves.

4. The image processing circuit of claim 3, wherein the LTM circuit further comprises a tenth circuitry to perform spatial interpolation of the interpolated luma values to generate the output color component value for the pixel, the output color component value representing an output luma component value for the pixel in the color converted version.

5. The image processing circuit of claim 4, wherein the LTM circuit further comprises an eleventh circuitry to determine the gain value for the pixel as a ratio of the output luma component value relative to the input luma component value.

6. The image processing circuit of claim 3, wherein the LTM circuit further comprises an eleventh circuitry to perform bilinear interpolation of the interpolated luma values to generate the output color component value for the pixel.

7. The image processing circuit of claim 1, wherein the LTM circuit further comprises a fifth circuitry to apply at least one of global tone adjustment, black-level compensation, and gamma correction on the output color component value for the pixel to generate a corrected color component value for the pixel.

8. The image processing circuit of claim 7, wherein the LTM circuit further comprises a sixth circuitry to determine the gain value for the pixel further based on the corrected color component value.

9. The image processing circuit of claim 1, further comprising:
a fifth circuitry to generate information about the mapping of coordinates of pixels in the processed image to coordinates of pixels in the input image; and
a sixth circuitry to provide the generated information about the mapping to the LTM circuit.

10. The image processing circuit of claim 1, further comprising a fifth circuitry to output the processed image as a plurality of processed tiles that are passed to the LTM circuit.

11. The image processing circuit of claim 1, wherein the LTM circuit further comprises a fifth circuitry to perform color space conversion of pixels in the output image to generate a color converted version of the output image having a same format as the input image.

12. A method for image processing, comprising:

determining an input color component value for a color component of a pixel in a version of a processed image, wherein the processed image is based on an input image;

determining an output color component value for the color component of the pixel, based on mapping of coordinates of pixels in the version of the processed image to coordinates of pixels in the input image that is used to generate the processed image;

determining a gain value for the pixel as a ratio of the output color component value relative to the input color component value; and adjusting color component values for color components of the pixel using the gain value to generate adjusted color component values for the color components of the pixel in an output image.

13. The method of claim 12, further comprising:

performing color space conversion of pixels in the processed image to generate a color converted version of the processed image; and determining an input luma component value for a pixel in the color converted version of the processed image.

14. The method of claim 13, further comprising:

determining, for the pixel in the color converted version based on the mapping, a corresponding subset of local tone mapping (LTM) curves in a look-up table (LUT);

providing the input luma component value for the pixel in the color converted version as an input entry to each LTM curve of the corresponding subset of LTM curves; and outputting interpolated luma values for the pixel in the color converted version generated based on the input entry to each LTM curve of the corresponding subset of LTM curves.

15. The method of claim 14, further comprising:

performing spatial interpolation of the interpolated luma values to generate the output color component value for the pixel, the output color component value representing an output luma component value for the pixel in the color converted version; and determining the gain value for the pixel as a ratio of the output luma component value relative to the input luma component value.

16. The method of claim 14, further comprising:

performing bilinear interpolation of the interpolated luma values to generate the output color component value for the pixel.

17. The method of claim 12, further comprising:

applying at least one of global tone adjustment, black-level compensation, and gamma correction on the output color component value for the pixel to generate a corrected color component value for the pixel; and determining the gain value for the pixel further based on the corrected color component value.

18. The method of claim 12, further comprising:

performing color space conversion of pixels in the output image to generate a color converted version of the output image having a same format as the input image.

19. An electronic device, comprising:

an image sensor configured to capture an input image; and a local tone mapping (LTM) circuit configured to receive a processed image based on the input image, the LTM circuit comprising:

a first circuitry to determine an input color component value for a color component of a pixel in a version of the processed image;

a second circuitry to determine an output color component value for the color component of the pixel, based on mapping of coordinates of pixels in the processed image to coordinates of pixels in the input image on which the processed image is based;

a third circuitry to determine a gain value for the pixel as a ratio of the output color component value relative to the input color component value; and a fourth circuitry to adjust color component values for color components of the pixel using the gain value to generate adjusted color component values for the color components of the pixel in an output image.

20. The electronic device of claim 19, wherein the LTM circuit further comprises:

a fifth circuitry to perform color space conversion of pixels in the processed image to generate a color converted version of the processed image;

a sixth circuitry to determine an input luma component value for a pixel in the color converted version of the processed image;

a seventh circuitry to determine, for the pixel in the color converted version based on the mapping, a corresponding subset of LTM curves in a look-up table (LUT);

an eighth circuitry to provide the input luma component value for the pixel in the color converted version as an input entry to each LTM curve of the corresponding subset of LTM curves;

a ninth circuitry to output interpolated luma values for the pixel in the color converted version generated based on the input entry to each LTM curve of the corresponding subset of LTM curves; and a tenth circuitry to perform spatial interpolation of the interpolated luma values to generate the output color component value for the pixel, the output color component value representing an output luma component value for the pixel in the color converted version.

* * * * *